US008339659B2

(12) United States Patent
Hopper et al.

(10) Patent No.: US 8,339,659 B2
(45) Date of Patent: Dec. 25, 2012

(54) PARTITIONING OF SHEETSIDE BITMAPS FOR TRANSFER FROM A PRINT CONTROLLER TO PRINTHEAD CONTROLLERS (75) Inventors: Samuel N. Hopper, Longmont, CO (US); John T. Varga, Longmont, CO (US)

(73) Assignee: Ricoh Production Print Solutions LLC, Boulder, CA (US)

( * ) Notice: Subject to any disclaimer, the term of this patent is extended or adjusted under 35 U.S.C. 154(b) by 972 days.

(21) Appl. No.: 12/326,253

(22) Filed: Dec. 2, 2008

(65) Prior Publication Data
US 2010/0134808 A1    Jun. 3, 2010

(51) Int. Cl.
G06K 15/10    (2006.01)
(52) U.S. Cl. ............... 358/1.8; 358/1.9; 347/5; 347/12; 347/20; 347/40; 347/41
(58) Field of Classification Search .......... 358/1.8, 358/1.9; 347/12, 20, 40, 41, 5
See application file for complete search history.

(56) References Cited

U.S. PATENT DOCUMENTS

| 4,989,016 | A | 1/1991 | Gatten et al. | |
| 7,192,114 | B2* | 3/2007 | Suzuki et al. | 347/19 |
| 2005/0078133 | A1 | 4/2005 | Molinet et al. | |
| 2005/0140714 | A1* | 6/2005 | Silverbrook et al. | 347/19 |
| 2005/0260021 | A1* | 11/2005 | Abello | 400/62 |
| 2006/0103689 | A1* | 5/2006 | Vinas et al. | 347/15 |
| 2007/0024667 | A1* | 2/2007 | Kim | 347/41 |
| 2007/0070108 | A1 | 3/2007 | Mantell et al. | |
| 2008/0266339 | A1* | 10/2008 | Snyder et al. | 347/12 |
| 2009/0135439 | A1* | 5/2009 | Bates et al. | 358/1.8 |
| 2009/0262370 | A1* | 10/2009 | Mantell et al. | 358/1.9 |

* cited by examiner

Primary Examiner — Jacky X Zheng
(74) Attorney, Agent, or Firm — Duft Bornsen & Fishman, LLP

(57) ABSTRACT

Printing systems, print controllers, and associated methods of partitioning sheetside bitmaps are disclosed. A print controller in one embodiment connects to a plurality of printhead controllers that are operable to control a plurality of printhead arrays. The print controller includes an interpreter system operable to receive a print job, and to convert an image in the print job into a full sheetside bitmap comprised of an array of pixels. The print controller also includes a partitioning system operable to process the full sheetside bitmap to identify the pixels in the full sheetside bitmap designated for printing on each of the printhead arrays, and to generate a partitioned sheetside bitmap for each printhead array that contains essentially the pixels designated for printing on the printhead array. The print controller further includes an interface system operable to transmit the partitioned sheetside bitmaps to the printhead controllers associated with the printhead arrays.

18 Claims, 6 Drawing Sheets

PARTITIONING OF SHEETSIDE BITMAPS FOR TRANSFER FROM A PRINT CONTROLLER TO PRINTHEAD CONTROLLERS

BACKGROUND OF THE INVENTION

1. Field of the Invention

The invention relates to the field of production printing systems and, in particular, to partitioning of sheetside bitmaps in a print controller before the sheetside bitmaps are sent to printhead controllers.

2. Statement of the Problem

A production printing system is a high-speed printer used for volume printing, such as 100 pages per minute or more. Production printing systems generally include a localized print controller that controls the overall operation of the printing system including, for example, host interfacing, interpretation or rendering, and lower level process control or interface features of print engines of the printing system. Host interaction may include appropriate adapters for coupling the printing system to one or more host systems that transmit print jobs to the printing system. The print jobs are generally encoded in the form of a page description language such as PostScript (PS), PCL, IPDS, etc.

In whatever form the print job may be encoded or formatted, the print controller within the printing system interprets the received information to generate sheetside bitmaps of the print job. The sheetside bitmaps represent the image to be printed on a side of a sheet of paper. Each sheetside bitmap generally comprises a 2-dimensional array of picture elements ("pixels") that represent a corresponding formatted sheet of the print job. Each pixel may represent an encoded color value in accordance with the requirements of the particular print job encoding and the capabilities of the printing system on which the print job is to be printed.

The print controller stores or buffers the sheetside bitmaps in accordance with storage capabilities of the particular architecture of a particular print controller. The print controller then forwards the sheetside bitmaps to one or more print engines (sometimes also referred to as an "imaging engine" or as a "marking engine"). The print engines include one or more printhead controllers that control one or more printhead arrays. Each printhead controller is associated with a printhead array so that the printhead controller is the system controlling how the printhead array discharges ink onto a medium. In a typical printing system, there is one printhead controller associated with a single printhead array.

Presently, when the print controller receives a print job and generates sheetside bitmaps, each pixel in the sheetside bitmaps is represented by one or more bits per pixel. Pixels of 8 bits or more can be used to represent grayscale or index color. Thus, in many production printing systems, the print controller sends full 8-bit sheetside bitmaps to each of the printhead controllers in the print engine. A full sheetside bitmap includes an entire set of pixels for an image.

After receiving an 8-bit sheetside bitmap, the printhead controller performs a halftoning or screening process on the 8-bit sheetside bitmap, which generates a 2-bit sheetside bitmap. The printhead controller then processes a bitmap mask assigned to that controller to determine which pixels in the 2-bit sheetside bitmap to print through its associated printhead array. For example, in a black and white printer, a printhead controller may determine that its associated printhead array is to print every other line of the 2-bit sheetside bitmap, or every other pixel of the 2-bit sheetside bitmap.

One problem with present production printing systems is that the interface between the print controller and the printhead controllers limits the printing speed of the printing system. The interface used between the print controller and the printhead controllers is typically an IEEE 1394 interface, also known as a FireWire® interface. An IEEE 1394 interface has a maximum capacity of about 40 Mbytes/second. In order to transmit an 8-bit sheetside bitmap from the print controller to one of the printhead controllers, a transmission rate of about 215 Mbytes/second is needed on average so that the printhead controllers are not "waiting" on data from the print controller. The print controller may use a compression scheme, such as PackBits, to compress the 8-bit sheetside bitmap before transmitting the bitmap to the printhead controllers. However, even if the sheetside bitmap is compressed, the interface between the print controller and the printhead controllers is not fast enough to transmit the compressed bitmap to the printhead controllers. As a result, the printhead controllers are not being utilized to their full processing capacity, and the printing system is not operating at its maximum printing speed.

SUMMARY OF THE INVENTION

Embodiments of the present invention solve the above and other related problems by partitioning a sheetside bitmap in the print controller, and transmitting partitioned sheetside bitmaps to the printhead controllers over the interface. Instead of transmitting the full sheetside bitmap to each of the printhead controllers as is presently done, the print controller transmits a partitioned sheetside bitmap to the printhead controllers over the interface. The partitioned sheetside bitmaps each represent less data than the full sheetside bitmap, and as a result the transmission rate of the interface is less of an issue. A relatively slow interface (i.e., 40 Mbytes/second or less) may still be used in the printing system. Also, the partitioned sheetside bitmap that is transmitted to each of the printhead controllers represents the pixels to be printed by the printhead array that is associated with the printhead controller. Thus, the printhead controller no long needs to process a bitmap mask to determine which pixels of a full sheetside bitmap to print, as the print controller partitions the full sheetside bitmap for the printhead controllers. The printhead controllers need only print the pixels indicated in the partitioned sheetside bitmap as instructed by the print controller. This advantageously saves processing time in the printhead controllers so that the printhead controllers may run faster.

One embodiment of the invention comprises a print controller for a production printing system adapted to connect to a plurality of printhead controllers operable to control a plurality of printhead arrays. The print controller includes an interpreter system operable to receive a print job, and to convert one or more images in the print job into a full sheetside bitmap comprised of an array of pixels. The print controller also includes a partitioning system operable to process the full sheetside bitmap to identify the pixels in the full sheetside bitmap designated for printing on each of the printhead arrays, and to generate a partitioned sheetside bitmap for each printhead array that contains essentially the pixels designated for printing on each printhead array. The print controller further includes an interface system operable to transmit the partitioned sheetside bitmaps to the printhead controllers associated with the printhead arrays.

The invention may include other exemplary embodiments described below.

DESCRIPTION OF THE DRAWINGS

The same reference number represents the same element or same type of element on all drawings.

DETAILED DESCRIPTION

FIGS. 1-6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
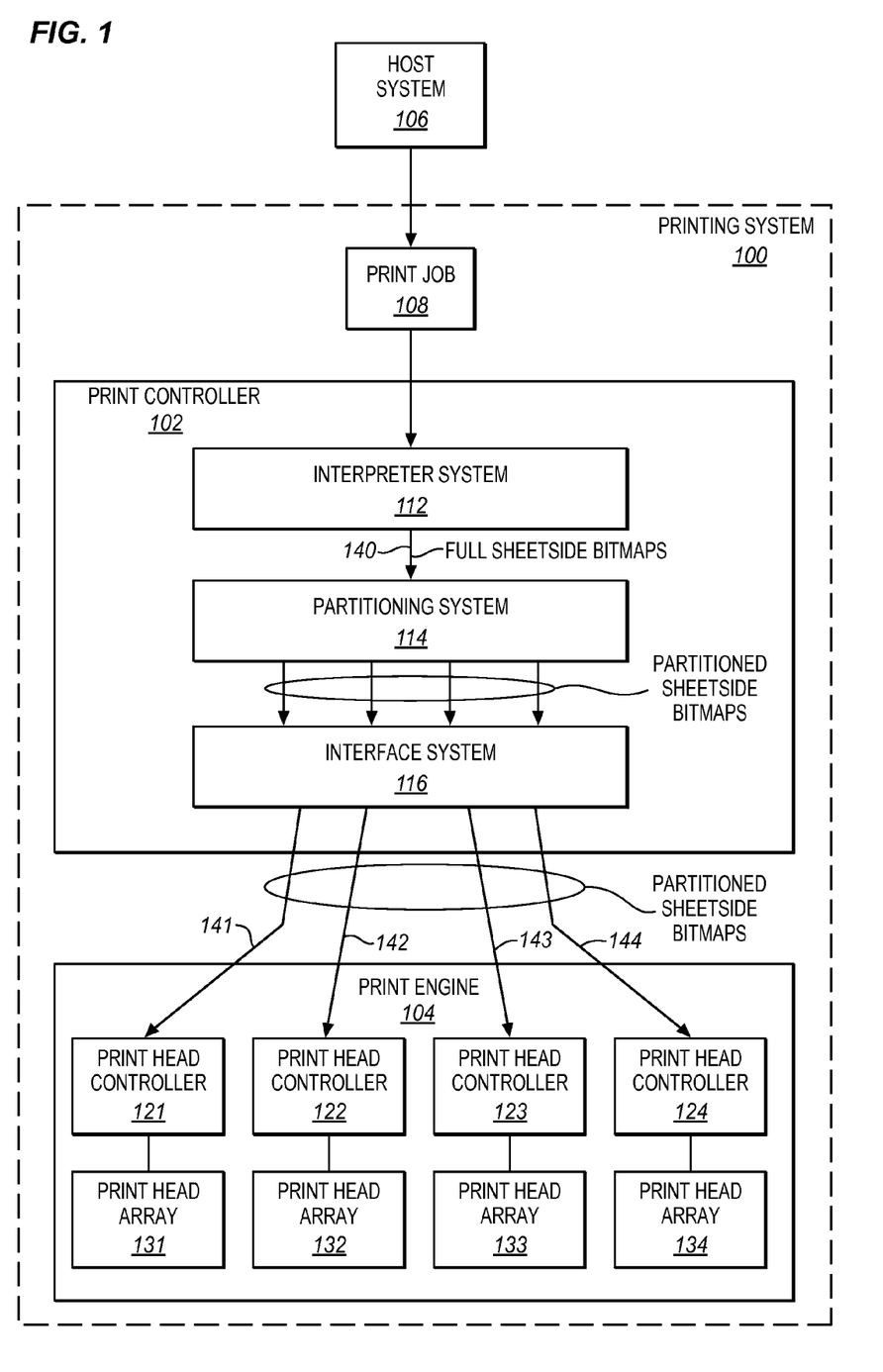
FIG. 1 is a block diagram illustrating a printing system in an exemplary embodiment of the invention.

FIG. 1 is a block diagram illustrating a printing system 100 in an exemplary embodiment of the invention. Printing system 100 comprises any system used to provide marks on a media, such as a continuous forms printer or a cut sheet page printer. In this embodiment, printing system 100 comprises a production printing system, which is a high-speed printer used for volume printing, such as 100 pages per minute or more. Printing system 100 includes a print controller 102 and one or more print engines 104. Print controller 102 comprises any system, server, or components operable to interface one or more host systems 106 with one or more print engines 104, and to control the printing of print jobs received from the host systems 106 on the print engines 104. Print controller 102 in this embodiment is a production print controller used for a production printing system. A production print controller is capable of concurrent page or sheetside rendering, meaning that an interpreter system in the print controller is operable to render multiple pages or sheetsides concurrently. Print engine 104 comprises any system operable to provide an imaging process to mark a printable medium, such as paper. Printing system 100 may include other components or systems not shown for the sake of brevity.

Print controller 102, in its generalized form, includes an interpreter system 112, a partitioning system 114, and an interface system 116. Interpreter system 112 comprises any system, device, or component operable to interpret, render, rasterize, or otherwise convert images (i.e., raw sheetsides) of a print job into sheetside bitmaps. The sheetside bitmaps generated by interpreter system 112 are each a 2-dimensional array of pixels representing an image of the print job, also referred to as full sheetside bitmaps. The 2-dimensional pixel arrays are considered "full" sheetside bitmaps because the bitmaps include the entire set of pixels for the image. Interpreter system 112 is operable to interpret or render multiple raw sheetsides concurrently so that the rate of rendering substantially matches the rate of imaging of production print engines. Partitioning system 114 comprises any system, device, or component operable to partition the full sheetside bitmaps into partitioned sheetside bitmaps. A partitioned sheetside bitmap comprises a bitmap that includes a subset of the pixels for an image instead of the entire set of pixels. Interface system 116 comprises any systems, devices, or components operable to communicate with the print engine 104. In one embodiment, interface system 116 comprises one or more IEEE 1394 interfaces, also referred to as a FireWire® interface.

Print controller 102 as shown in FIG. 1 is comprised of separate components. These separate components may represent hardware used to implement print controller 102. One or more of the separate components may also represent logical blocks implemented in a processor executing instructions.

Print engine 104, in its generalized form, includes a plurality of printhead controllers 121-124 and a plurality of printhead arrays 131-134. A printhead array comprises any component having multiple nozzles, jets, or other elements that discharge ink or some other substance used to mark a medium, such as paper. A printhead controller 121-124 comprises any system, device, or component operable to control a printhead array. In a typical printing system, there is a one-to-one relationship between the printhead controller and the printhead array, as is illustrated in FIG. 1. Thus, one printhead controller controls one printhead array. However, in some embodiments, a printhead controller may control multiple printhead arrays. Either way, a printhead controller that controls a printhead array is referred to as being "associated" with the printhead array.

Figure 2:
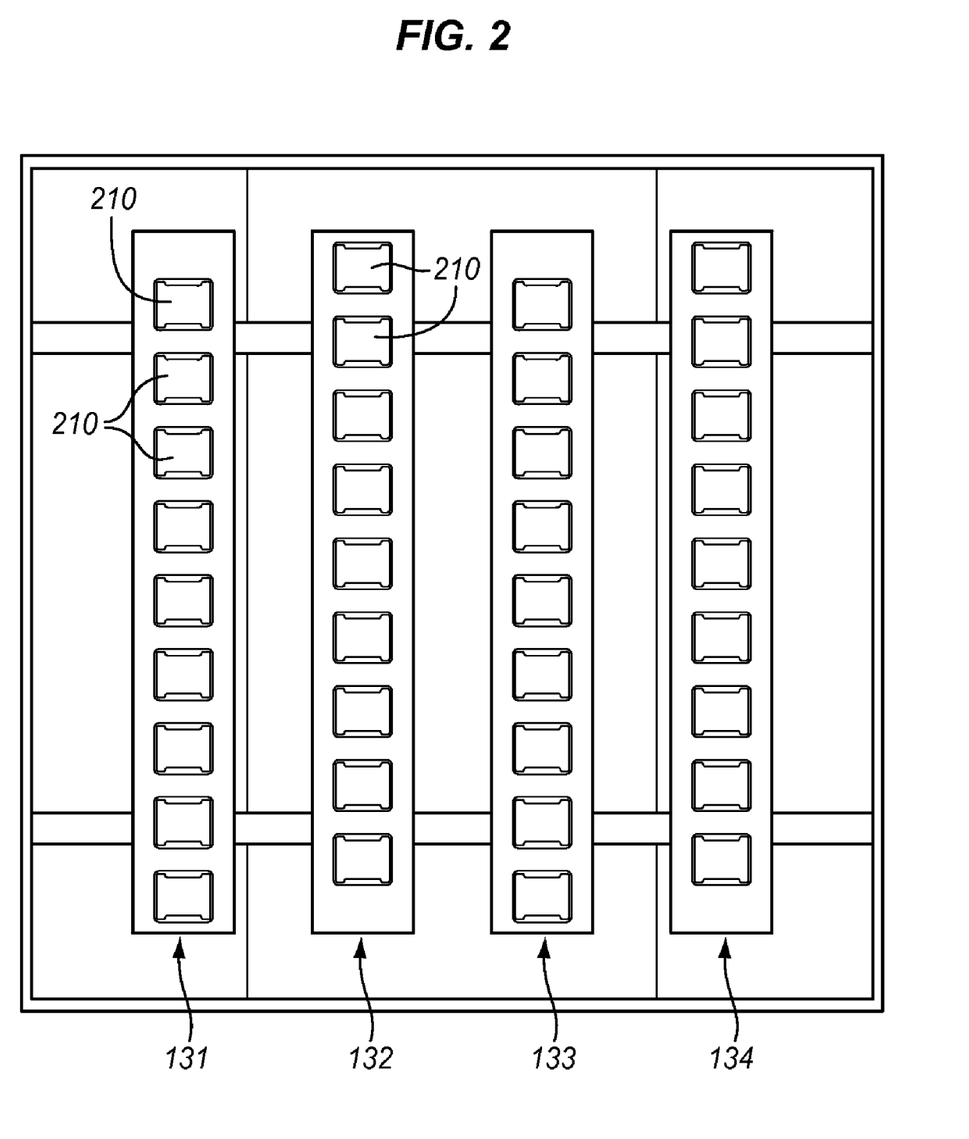
FIG. 2 illustrates printhead arrays.

FIG. 2 illustrates printhead arrays 131-134. Each printhead array 131-134 is comprised of a plurality of printheads 210. Each individual printhead 210 includes multiple tiny nozzles (e.g., 360 nozzles per printhead depending on resolution) that are operable to discharge ink or some other substance onto a printable medium when the medium is passed underneath the printheads 210. Printhead controllers 121-124 are operable to control which nozzles discharge ink on a printable medium to print an image.

In prior printing systems, the printhead controllers receive a full sheetside bitmap from the print controller. The full sheetside bitmap comprises n-bit representations of each pixel of the image. After receiving the full sheetside bitmap, each printhead controller processes a bitmap mask to determine which of the pixels of the full sheetside bitmap are to be printed by its associated printhead array. The printhead controllers then control their associated printhead array to print the pixels indicated by the bitmap mask.

According to the embodiments described herein, partitioned sheetside bitmaps are sent from print controller 102 to printhead controllers 121-124 instead of a full sheetside bitmap. Instead of having each printhead controller 121-124 process a bitmap mask to determine which pixels to print on its associated printhead array, print controller 102 partitions the full sheetside bitmap and sends the partitioned sheetside bitmaps to printhead controllers 121-124. The partitioned sheetside bitmap that is sent to each printhead controller consists essentially of the pixels that the printhead array 131-134, which is associated with the printhead controller 121-124, is assigned to print. Thus, printhead controllers 121-124 need only process the partitioned sheetside bitmap to determine which pixels to print on its associated printhead array 131-134. The following description discusses partitioning sheetside bitmaps.

Figure 3:
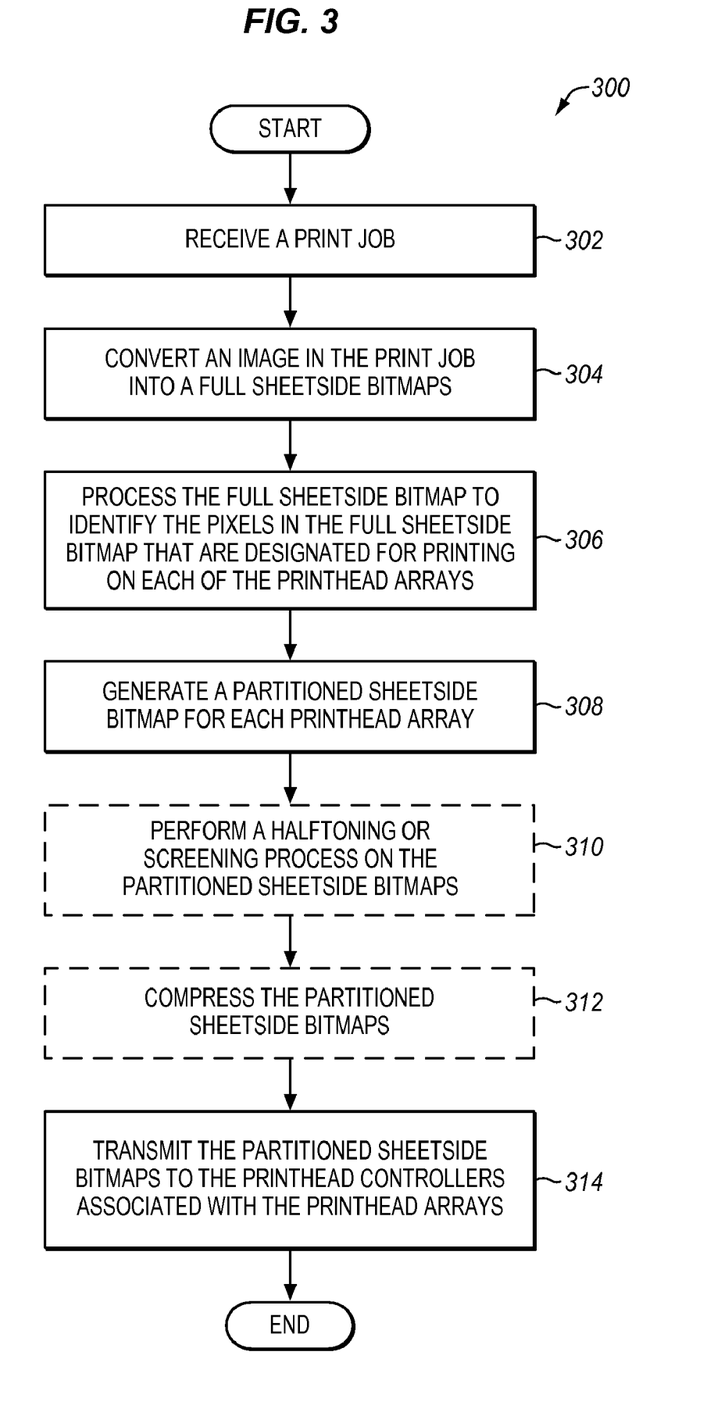
FIG. 3 is a flow chart illustrating a method of partitioning sheetside bitmaps in an exemplary embodiment of the invention.

FIG. 3 is a flow chart illustrating a method 300 of partitioning sheetside bitmaps in an exemplary embodiment of the invention. The steps of method 300 will be described with reference to print controller 102 in FIG. 1, although method 300 may be performed by other print controllers. The steps of the flow chart in FIG. 3 are not all inclusive and may include other steps not shown.

In step 302, interpreter system 112 receives a print job 108 from host system 106. The print job 108 may comprise PostScript (PS) jobs, PDF jobs, PCL jobs, PJL jobs, PPML jobs, or some other type of job that has one or more images that are to be printed. In step 304, interpreter system 112 converts (i.e., renders, rips, rasterizes) an image in the print job 108 into a sheetside bitmap 140. The sheetside bitmap 140 generated by interpreter system 112 is a 2-dimensional array of pixels representing an image of the print job, also referred to as a full sheetside bitmap. The 2-dimensional pixel array is considered a "full" sheetside bitmap because the bitmap includes the entire set of pixels for the image. The pixels are represented as n-bit values, such as 8-bit values. Interpreter system 112 then forwards the full sheetside bitmap 140 to partitioning system 114.

In step 306, partitioning system 114 processes the full sheetside bitmap 140 to identify the pixels in the full sheetside bitmap 140 that are designated for printing on each of the printhead arrays 131-134. In identifying the pixels designating for printing on each of the printhead arrays 131-134, partitioning system 114 may process the full sheetside bitmap 140 and a bitmap mask for each of the printhead arrays 131-134. For example, partitioning system 114 may process the full sheetside bitmap 140 and a bitmap mask for printhead array 131 to identify a subset of the pixels in the full sheetside bitmap 140 that are designated for printing on printhead array 131. Partitioning system 114 may also process the full sheetside bitmap 140 and a bitmap mask for printhead array 132 to identify a subset of the pixels in the full sheetside bitmap 140 that are designated for printing on printhead array 132. Partitioning system 114 may continue this process to identify the pixels designated for printing on each of the printhead arrays 131-134.

Based on the pixels identified for each of the printhead arrays 131-134, partitioning system 114 generates a partitioned sheetside bitmap 141-144 for each printhead array 131-134 in step 308. The partitioned sheetside bitmap 141-144 generated for each printhead array 131-134 contain essentially the pixels designated for printing on an individual printhead array 131-134. The partitioned sheetside bitmaps 141-144 do not include the entire set of pixels for the full sheetside bitmap 140, but includes only (or essentially only) those pixels that are designated for printing by an individual printhead array 131-134. In other words, partitioning system 114 partitions the full sheetside bitmap 140 based on the printing responsibility of each of the printhead arrays 131-134 to generate the partitioned sheetside bitmaps 141-144. The partitioned sheetside bitmaps 141-144 each represent a subset of the pixels of the full sheetside bitmap 140 that is designated for printing on a single printhead array 131-134.

After the partitioned sheetside bitmaps 141-144 are generated, partitioning system 114 may optionally perform a halftoning or screening process on the partitioned sheetside bitmaps 141-144 in step 310, which reduces the size of the partitioned sheetside bitmaps 141-144. For example, if each of the partitioned sheetside bitmaps 141-144 comprises an 8-bit bitmap, then the halftoning or screening process may generate a 2-bit bitmap. Partitioning system 114 may optionally compress each of the partitioned sheetside bitmaps 141-144 in step 312. Partitioning system 114 may use PackBits or some other compression scheme to compress the partitioned sheetside bitmaps 141-144.

In step 314, interface system 116 transmits the partitioned sheetside bitmaps 141-144 to printhead controllers 121-124 associated with the printhead arrays 131-134. For example, interface system 116 transmits partitioned sheetside bitmap 141 to printhead controller 121, transmits partitioned sheetside bitmap 142 to printhead controller 122, etc. Because the partitioned sheetside bitmaps 141-144 include only a subset of the entire number of pixels of the full sheetside bitmap 140, the amount of data that interface system 116 needs to transmit to each printhead controller 121-124 is reduced. Also, the partitioned sheetside bitmaps 141-144 may be screened and compressed in the print controller 102, which further reduces the amount of data that interface system 116 needs to transmit to each printhead controller 121-124. As a result, slower interfaces, such as IEEE 1394 interfaces, may be implemented in printing system 100 without being a limiting factor in the overall printing speed. Also, printhead controllers 121-124 are able to run faster when less data needs to be processed.

A similar process as described above is performed for other images in print job 108 so that the printhead controllers 121-124 receives partitioned sheetside bitmaps 141-144 from print controller 102.

Figure 4:
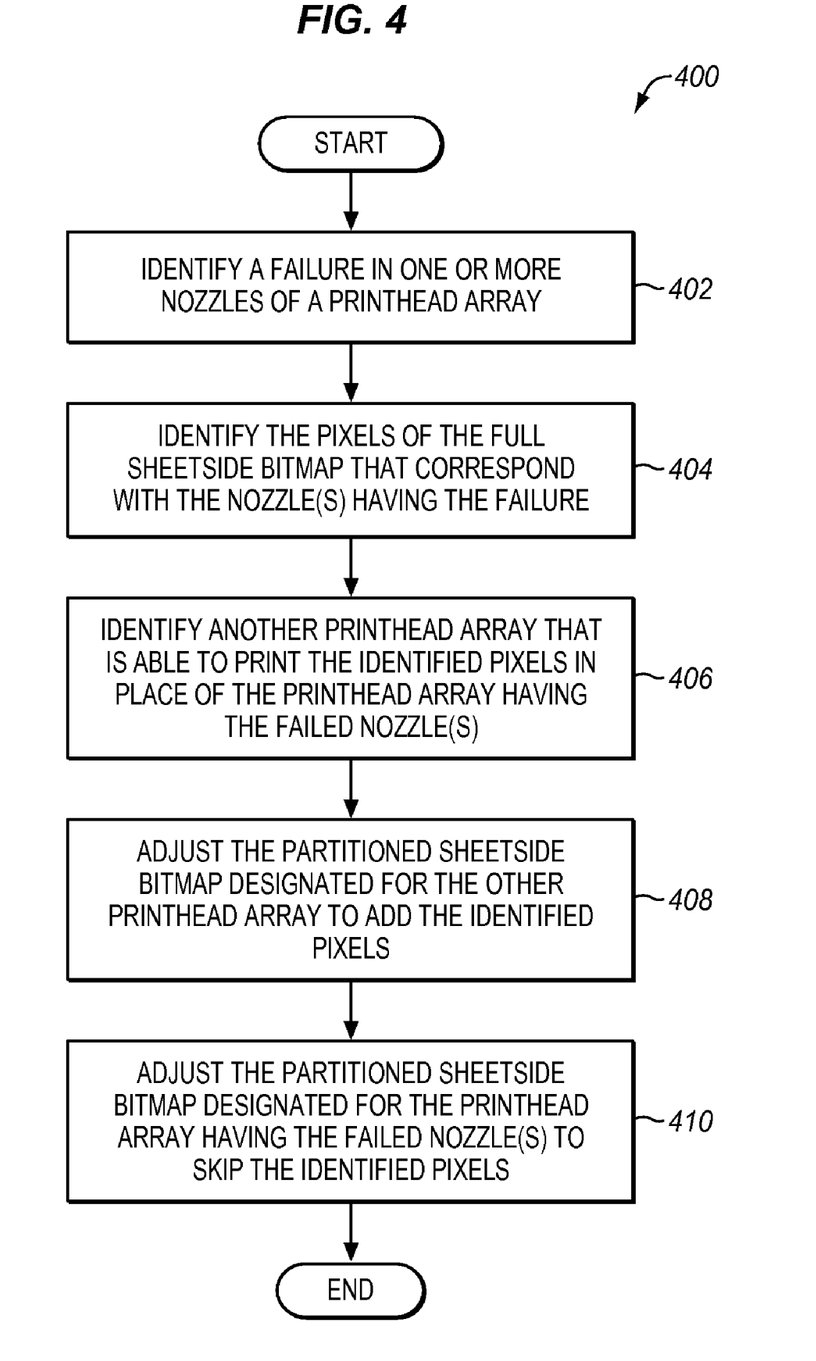
FIG. 4 is a flow chart illustrating method of handling failures in a printhead array in an exemplary embodiment of the invention.

In some instances, there may be errors or failures detected on a printhead 210 in a printhead array 131-134. FIG. 4 is a flow chart illustrating method of handling failures in an exemplary embodiment of the invention. In step 402, partitioning system 114 identifies a failure in one or more nozzles of a printhead array 131-134. In identifying the failure, partitioning system 114 may actively detect the failure in one or more nozzles, or may be alerted to the failure from another system. In response to identifying the failure, partitioning system 114 identifies the pixels of the full sheetside bit that correspond with the nozzle(s) having the failure in step 404. Partitioning system 114 also identifies another printhead array 131-134 that is able to print the identified pixels in place of printhead array 131-134 having the failed nozzle(s) in step 406. In step 408, partitioning system 114 adjusts the partitioned bitmap 141-144 designated for the other printhead array to add the identified pixels. In step 410, partitioning system 114 may also adjust the partitioned bitmap 141-144 designated for the printhead array having the failed nozzle(s) to skip the identified pixels.

For example, assume that one or more nozzles in printhead array 131 become clogged and are unable to discharge ink. This failure is identified by partitioning system 114. In response to identifying the failure, partitioning system 114 identifies the pixels of the full sheetside bitmap 140 that correspond with the clogged nozzles. Partitioning system 114 also identifies that another printhead array 133 is able to print the identified pixels in place of printhead array 131. Thus, partitioning system 114 adjusts the partitioned sheetside bitmap 143 destined for printhead controller 123 to add the identified pixels to partitioned sheetside bitmap 143. Partitioning system 114 also adjusts the partitioned sheetside bitmap 141 destined for printhead controller 121 to skip the identified pixels. The data used to add pixels to a partitioned sheetside bitmap 141-144 or to skip pixels in a partitioned sheetside bitmaps 141-144 may also be referred to as correction data.

The addition of the correction data to partitioned sheetside bitmaps 141-144 may simultaneously reduce the amount of data to process in a single printhead controller 121-124 and increase the amount of data to process in the single printhead controller 121-124. For example, as nozzles fail in printhead array 131, the amount of data that printhead controller 121 will process will decrease accordingly. At the same time, it is assumed that printhead controller 121 will need to print pixels in place of other nozzles on other printhead arrays 132-134 that have failed nozzles, which increases the amount of data that printhead controller 121 processes. There should be no undue burden on any particular printhead controller 121-124 due to the addition of the correction data because the delta in the amount of data processed by a single printhead controller 121-124 over time is statistically averaged out.

Figure 5:
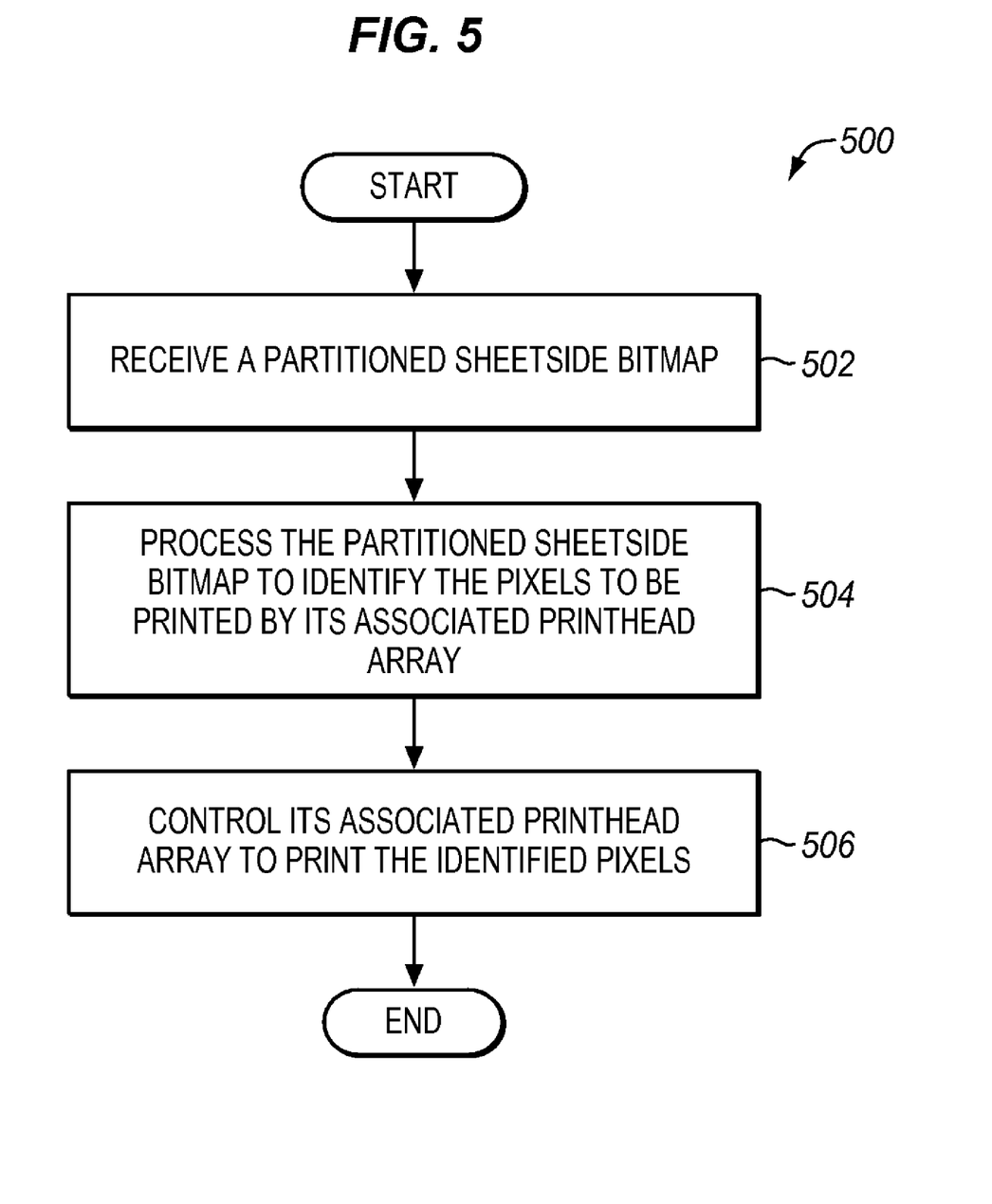
FIG. 5 is a flow chart illustrating method of processing partitioned sheetside bitmaps in printhead controllers in an exemplary embodiment of the invention.

FIG. 5 is a flow chart illustrating method of processing partitioned sheetside bitmaps 141-144 in printhead controllers 121-124 in an exemplary embodiment of the invention. In step 502, a printhead controller 121-124 receives a partitioned sheetside bitmap 141-144 from print controller 102. If the partitioned sheetside bitmap 141-144 has been compressed in print controller 102, then printhead controller 121-124 de-compresses the partitioned sheetside bitmap 141-144. In step 504, printhead controller 121-124 processes the partitioned sheetside bitmap 141-144 to identify the pixels to be printed by its associated printhead array 131-134. In step 506, printhead controller 121-124 controls printhead array 131-134 to print the identified pixels on a printable medium.

To identify the pixels to be printed (see step 504) in one embodiment, printhead controller 121-124 processes the partitioned sheetside bitmap 141-144 which includes n-bit data on the pixels to be printed. The partitioned sheetside bitmap 141-144 may include positioning data which indicates where the pixels should be printed. For example, the positioning data may include a start position for the identified pixels (start on row 1, column 1), and a format for printing, such as print every other row or every other column. Printhead controllers 121-124 then uses the positioning data to control the printhead arrays 131-134 to print those pixels indicated in the partitioned sheetside bitmap 141-144.

To identify the pixels to be printed (see step 504) in another embodiment, the printhead controller 121-124 may expand the partitioned sheetside bitmap 141-144 into a full sheetside bitmap. To expand a partitioned sheetside bitmap 141-144, the printhead controller 121-124 processes n-bit data on the pixels to be printed and the positioning data to fill in a full sheetside bitmap with the pixels in the appropriate positions. The printhead controller 121-124 then fills the remaining pixel locations with a null value or some other value which indicates no printing at this pixel location. With the partitioned sheetside bitmap 141-144 expanded, the printhead controller 121-124 controls the printhead arrays 131-134 to print the pixels indicated in the expanded version of the partitioned sheetside bitmap 141-144.

The partitioned sheetside bitmaps 141-144 may also include a flag or some other indicator of correction data. Correction data comprises information that indicates additional pixels that need to be printed by one printhead controller 121-124, or indicates pixels that should be skipped by the printhead controller 121-124. If correction data in a partitioned sheetside bitmap 141-144 that is received by a printhead controller (i.e., printhead controller 121) indicates additional pixels, this means that a failure has been detected in another printhead array 132-134, and print controller 102 is instructing printhead controller 121 to print these additional pixels. If the correction data indicates skipped pixels, this means that a failure has been detected in printhead array 131, and print controller 102 is instructing printhead controller 121 to skip the printing of these pixels. For example, the correction data may comprise position data and an n-bit value for each additional pixel that needs to be printed. The correction data may also comprise position data for each pixel that should be skipped. The printhead controller 121 thus processes the correction data to determine which additional pixels to print on its associated printhead array 131, or to determine which of the identified pixels in the partitioned sheetside bitmap 141 should be skipped (i.e., due to a failure in its associated printhead array 131). The position data for additional pixels and skipped pixels is usually static, so this data may only have to be communicated once and stored rather than being sent repetitively in each partitioned sheetside bitmap.

Figure 6:
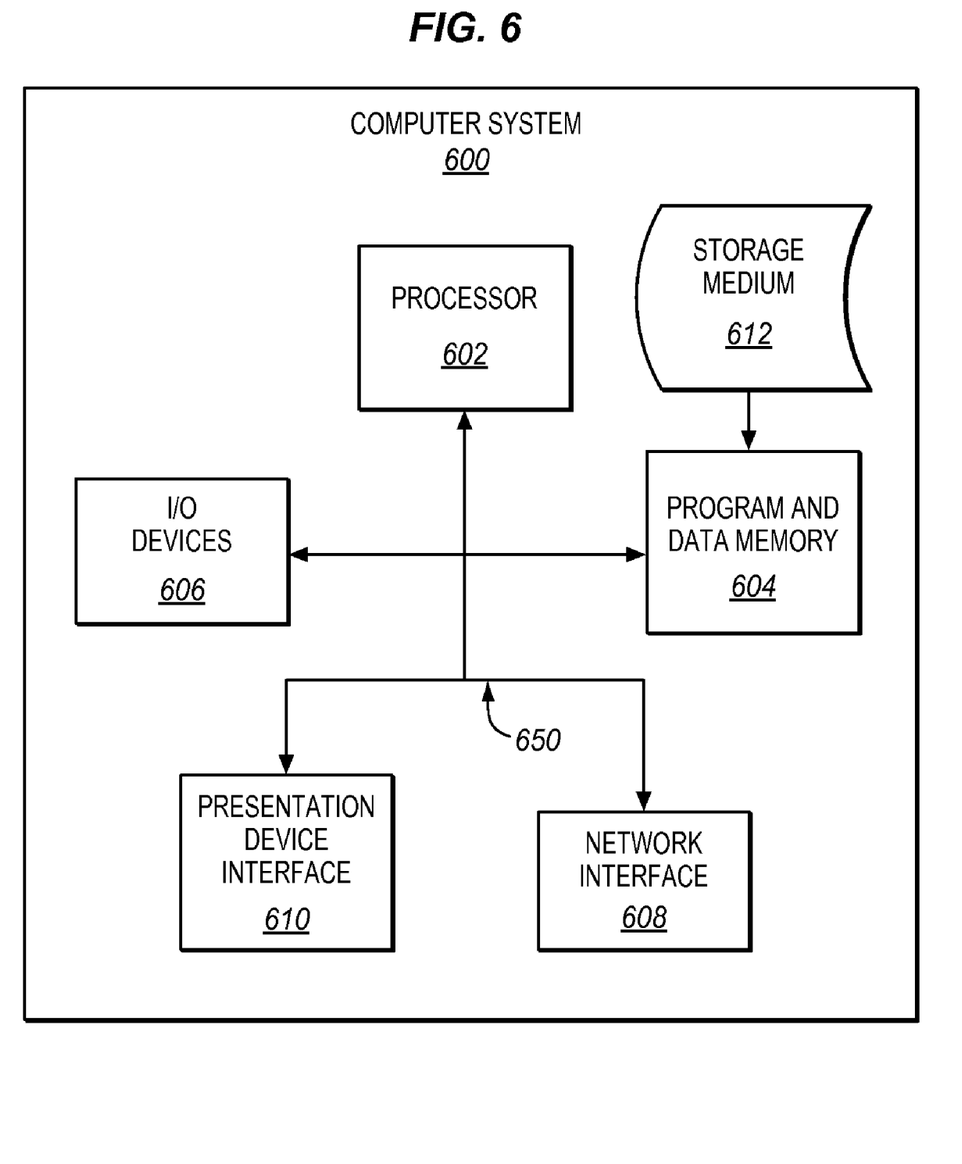
FIG. 6 illustrates a computer system operable to execute computer readable medium embodying programmed instructions to perform desired functions in an exemplary embodiment of the invention.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 is a block diagram depicting a computer system 600 operable to provide features and aspects hereof by executing programmed instructions and accessing data stored on a computer readable storage medium 612.

Furthermore, embodiments of the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 600 suitable for storing and/or executing program code will include at least one processor 602 coupled directly or indirectly to memory elements 604 through a system bus 650. The memory elements 604 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation device such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A print controller for a production printing system adapted to connect to a plurality of printhead controllers that are operable to control a plurality of printhead arrays, the print controller comprising:
   an interpreter system operable to receive a print job, and to convert at least one image in the print job into a full sheetside bitmap comprised of an array of pixels;
   a partitioning system operable to process the full sheetside bitmap by using a bitmap mask for each of the printhead arrays to identify the pixels in the full sheetside bitmap designated for printing by each of the printhead arrays, and to generate a partitioned sheetside bitmap for each printhead array that contains essentially the pixels designated for printing by the printhead array and further includes positioning data that comprises a start position for the pixels designated for printing and further comprises a format for printing; and
   an interface system operable to transmit the partitioned sheetside bitmaps to the printhead controllers associated with the printhead arrays.

2. The print controller of claim 1 wherein:
   the partitioning system is further operable to compress the partitioned sheetside bitmaps.

3. The print controller of claim 1 wherein:
   the partitioning system is further operable to perform a screening process on the partitioned sheetside bitmaps.

4. The print controller of claim 1 wherein the interface system comprises an IEEE 1394 interface.

5. The print controller of claim 1 wherein:
   the partitioning system is further operable to identify a failure in one of the printhead arrays, to identify the pixels of the full sheetside bitmap that correspond with the failure in the one printhead array, to identify another printhead array that is able to print the identified pixels in place of the one printhead array, and to adjust the partitioned sheetside bitmap designated for the other printhead array to add the identified pixels.

6. The print controller of claim 5 wherein:
   the partitioning system is further operable to adjust the partitioned sheetside bitmap designated for the one printhead array to skip the identified pixels.

7. A method of partitioning sheetside bitmaps for transmission to a plurality of printhead controllers operable to control a plurality of printhead arrays, the method comprising:
   receiving a print job;
   converting at least one image in the print job into a full sheetside bitmap comprised of an array of pixels;
   processing the full sheetside bitmap by using a bitmap mask for each of the printhead arrays to identify the pixels in the full sheetside bitmap designated for printing by each of the printhead arrays;
   generating a partitioned sheetside bitmap for each printhead array that contains essentially the pixels designated for printing by the printhead array and further includes positioning data that comprises a start position for the pixels designated for printing and comprises a format for printing; and
   transmitting the partitioned sheetside bitmaps to the printhead controllers associated with the printhead arrays.

8. The method of claim 7 further comprising:
   compressing the partitioned sheetside bitmaps before transmission to the printhead controllers.

9. The method of claim 7 further comprising:
   performing a screening process on the partitioned sheetside bitmaps before transmission to the printhead controllers.

10. The method of claim 7 further comprising:
    identifying a failure in one of the printhead arrays;
    identifying the pixels of the full sheetside bitmap that correspond with the failure in the one printhead array;
    identifying another printhead array that is able to print the identified pixels in place of the one printhead array; and
    adjusting the partitioned sheetside bitmap designated for the other printhead array to add the identified pixels.

11. The method of claim 10 further comprising:
    adjusting the partitioned sheetside bitmap designated for the one printhead array to skip the identified pixels.

12. A non-transitory computer readable medium embodying programmed instructions which, when executed by a computer system, are operable to execute a method of partitioning sheetside bitmaps for transmission to a plurality of printhead controllers that are operable to control a plurality of printhead arrays, the method comprising: receiving a print job;
    converting at least one image in the print job into a full sheetside bitmap comprised of an array of pixels;
    processing the full sheetside bitmap by using a bitmap mask for each of the printhead arrays to identify the pixels in the full sheetside bitmap designated for printing by each of the printhead arrays;
    generating a partitioned sheetside bitmap for each printhead array that contains essentially the pixels designated for printing by the printhead array and further includes positioning data that comprises a start position for the pixels designated for printing and comprises a format for printing; and
    transmitting the partitioned sheetside bitmaps to the printhead controllers associated with the printhead arrays.

13. A production printing system comprising:
    a plurality of printhead arrays operable to discharge ink on a printable medium;
    a plurality of printhead controllers operable to control the printhead arrays; and
    a print controller connected to the printhead controllers over a data interface, the print controller operable to receive a print job, to convert at least one image in the print job into a full sheetside bitmap comprised of an array of pixels, to partition the full sheetside bitmap by processing a bitmap mask for each of the printhead arrays to generate partitioned sheetside bitmaps that are each designated for a single printhead array and that each further include positioning data that comprises a start position for the pixels designated for printing and comprises a format for printing; and
    to transmit the partitioned sheetside bitmaps to the appropriate printhead controllers that are associated with the printhead arrays.

14. The production printing system of claim 13 wherein:
    the print controller is further operable to process the full sheetside bitmap and a bitmap mask for each of the printhead arrays to partition the full sheetside bitmap based on the printing responsibility of each of the printhead arrays.

15. The production printing system of claim 13 wherein:
    the print controller is further operable to compress the partitioned sheetside bitmaps before transmission to the printhead controllers over the data interface.

16. The production printing system of claim 13 wherein:
    the print controller is further operable to perform a screening process on the partitioned sheetside bitmaps before transmission to the printhead controllers.

17. The production printing system of claim 13 wherein the data interface comprises an IEEE 1394 interface.

18. The production printing system of claim 13 wherein:

each of the printhead controllers are further operable to receive a partitioned sheetside bitmap, to process the partitioned sheetside bitmap to identify the pixels to be printed by its associated printhead array, and to control its associated printhead array to print the identified pixels from the partitioned sheetside bitmap.

\* \* \* \* \*